US010256699B2

(12) United States Patent
Lassila et al.

(10) Patent No.: US 10,256,699 B2
(45) Date of Patent: Apr. 9, 2019

(54) METHOD AND DEVICE FOR LIQUID COOLING OF ELECTRIC MOTOR AND TRANSMISSION CONFIGURATION

(71) Applicant: BAE Systems Hägglunds Aktiebolag, Örnsköldsvik (SE)

(72) Inventors: Viktor Lassila, Arnäsvall (SE); Oskar Prinsback, Järved (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 228 days.

(21) Appl. No.: 15/023,322

(22) PCT Filed: Sep. 18, 2014

(86) PCT No.: PCT/SE2014/051081
§ 371 (c)(1),
(2) Date: Mar. 18, 2016

(87) PCT Pub. No.: WO2015/041599
PCT Pub. Date: Mar. 26, 2015

(65) Prior Publication Data
US 2016/0254730 A1 Sep. 1, 2016

(30) Foreign Application Priority Data

Sep. 20, 2013 (SE) ........................ 1351091

(51) Int. Cl.
*H02K 9/19* (2006.01)
*B60K 1/00* (2006.01)
(Continued)

(52) U.S. Cl.
CPC ............... *H02K 9/19* (2013.01); *B60K 1/00* (2013.01); *B60K 17/046* (2013.01);
(Continued)

(58) Field of Classification Search
CPC ............ H02K 9/19; H02K 5/20; H02K 7/116
See application file for complete search history.

(56) References Cited

U.S. PATENT DOCUMENTS 5,682,074 A  10/1997 Di Pietro et al.
7,156,195 B2 * 1/2007 Yamagishi .......... F16H 57/0476
180/65.1
(Continued)

FOREIGN PATENT DOCUMENTS

DE  102011076525 A1  11/2012
EP       2639941 A1   9/2013
WO    2013/085452 A1  6/2013

OTHER PUBLICATIONS

Extended European Search Report (includes Supplementary European Search Report and European Search Opinion) received for European Patent Application No. 14846061.1, dated Feb. 21, 2017, 5 pages.

(Continued)

*Primary Examiner* — Dang D Le
(74) *Attorney, Agent, or Firm* — Morrison & Foerster LLP (57) ABSTRACT

A method and device for liquid cooling of an electric motor and a transmission configuration. The electric motor includes a rotor with a rotor shaft and a stator provided with windings, and the transmission configuration includes a transmission shaft. The rotor and transmission configuration are journally supported by a support configuration. Supplying a liquid for cooling via the support configuration is performed in such a way that the electric motor as well as the transmission configuration are cooled.

17 Claims, 4 Drawing Sheets

(51) Int. Cl.
*B60K 17/04* (2006.01)
*F16H 57/04* (2010.01)
*H02K 5/20* (2006.01)
*B60K 11/02* (2006.01)

(52) U.S. Cl.
CPC .......... *F16H 57/0482* (2013.01); *H02K 5/20* (2013.01); *B60K 11/02* (2013.01); *B60K 2001/006* (2013.01)

(56) References Cited

U.S. PATENT DOCUMENTS

| | | | |
|---|---|---|---|
| 7,884,511 B2 * | 2/2011 | Mogi | B60K 17/12 310/54 |
| 2002/0077209 A1 * | 6/2002 | El-Antably | B60K 6/26 475/159 |
| 2006/0022528 A1 | 2/2006 | Burgman et al. | |
| 2008/0024020 A1 | 1/2008 | Iund et al. | |

OTHER PUBLICATIONS

International Preliminary Report on Patentability received for PCT Patent Application No. PCT/SE2014/051081, dated Mar. 31, 2016, 6 pages.

International Search Report and Written Opinion received for PCT Patent Application No. PCT/SE2014/051081, dated Dec. 19, 2014, 10 pages.

* cited by examiner

METHOD AND DEVICE FOR LIQUID COOLING OF ELECTRIC MOTOR AND TRANSMISSION CONFIGURATION

CROSS-REFERENCE TO RELATED APPLICATIONS

This application is a U.S. National Stage patent application of PCT/SE2014/051081, filed on 18 Sep. 2014, which claims priority to Swedish Application No. 1 351 091-2 filed on 20 Sep. 2013, the entire contents of each one of which is incorporated herein by reference.

BACKGROUND OF THE INVENTION

During drive electric motors are heated whereby cooling is required to divert the heat. Cooling of an electric motor may be effected by means of different types of cooling media such as for example air, water or oil.

FIELD OF THE INVENTION

The invention relates to a method for liquid cooling of an electric motor and transmission configuration according to the claims. The invention relates to a device for liquid cooling of an electric motor and transmission configuration according to the claims. In for example high performance electric motors efficient cooling is highly essential in order to achieve good performance. Cooling of the active parts of the electric motor directly affect its performance. Liquid cooling by means of for example oil may hereby result in efficient cooling of the electric motor and consequently improve performance of the electric motor.

Further, such electric motors are connected to transmissions in the form of for example reduction gears which also require cooling.

BRIEF SUMMARY OF THE INVENTION

An object of the present invention is to provide a method for liquid cooling of an electric motor and transmission configuration which results in easy and efficient cooling of the same.

An object of the present invention is to provide a device for liquid cooling of an electric motor and transmission configuration which results in easy and efficient cooling of the same.

These and other objects, apparent from the following description, are achieved by a method and device for liquid cooling of electric motor and transmission configuration which are of the type stated by way of introduction and which in addition exhibits the features recited in the claims.

According to the invention the objects are achieved by a method for liquid cooing of an electric motor and a transmission configuration, which electric motor comprises a rotor with a rotor shaft and a stator provided with windings, and where the transmission configuration comprises a transmission shaft, wherein rotor and transmission configuration are journally supported by means of a support configuration, comprising the steps of: supplying a liquid for said cooling via said support configuration in such a way that said electric motor as well as said transmission configuration are cooled. Hereby efficient cooling of both electric motor and transmission configuration is facilitated with few components in that an already existing support configuration is utilized for the cooling of both electric motor and transmission configuration where the liquid for cooling is utilized for lubrication of the transmission configuration. This further facilitates a cost efficient and compact construction.

According to an embodiment of the method said liquid is oil-based. Hereby efficient cooling if facilitated in that oil is a very efficient cooling liquid. Further, use of oil in an oil sump of a vehicle is facilitated, where the electric motor and the transmission configuration are in a housing configuration with said oil sump at the bottom of the housing, wherein the oil in the oil sump is supplied via the support configuration for cooling and lubrication of electric motor and transmission configuration.

According to an embodiment of the method said support configuration has a main extension plane essentially perpendicular to said axial direction of said shafts. Hereby space efficient support of electric motor and transmission configuration is obtained.

According to an embodiment of the method at least one nozzle for liquid supply for said cooling is supported by means of said support configuration. Hereby a simple construction facilitating efficient cooling of electric motor and transmission configuration is obtained.

According to an embodiment of the method said support configuration is arranged between an end of the electric motor on the one hand and said transmission configuration on the other. This results in a simple construction for bearing of the electric motor and the transmission configuration.

According to an embodiment of the method said support configuration is arranged outside the electric motor as well as said transmission configuration viewed in the axial direction of said shafts. This facilitates a compact construction.

According to the invention the objects are achieved by a device for liquid cooing of an electric motor and a transmission configuration, which electric motor comprises a rotor with a rotor shaft and a stator provided with windings, and where the transmission configuration comprises a transmission shaft, wherein rotor and transmission configuration are journally supported by means of a support configuration, further comprising means for supplying a liquid for said cooling via said support configuration in such a way that said electric motor as well as said transmission configuration are cooled. Hereby efficient cooling of both electric motor and transmission configuration is facilitated with few components in that an already existing support configuration is utilized for the cooling of both electric motor and transmission configuration where the liquid for cooling is utilized for lubrication of the transmission configuration. This further facilitates a cost efficient and compact construction.

According to an embodiment of the device said liquid is oil-based. Hereby efficient cooling if facilitated in that oil is a very efficient cooling liquid. Further, use of oil in an oil sump of a vehicle is facilitated, where the electric motor and the transmission configuration are in a housing configuration with said oil sump at the bottom of the housing, wherein the oil in the oil sump is supplied via the support configuration for cooling and lubrication of electric motor and transmission configuration.

According to an embodiment of the device said support configuration has a main extension plane essentially perpendicular to said axial direction of said shafts. Hereby space efficient support of electric motor and transmission configuration is obtained.

According to an embodiment of the device at least one nozzle for liquid supply for said cooling is arranged to be supported by means of said support configuration. Hereby a simple construction facilitating efficient cooling of electric motor and transmission configuration is obtained.

According to an embodiment of the device said support configuration is arranged between an end of the electric motor on the one hand and said transmission configuration on the other. This results in a simple construction for bearing of the electric motor and the transmission configuration.

According to an embodiment of the device said support configuration is arranged outside the electric motor as well as said transmission configuration viewed in the axial direction of said shafts. This facilitates a compact construction.

According to an embodiment of the device said support configuration is constituted by a wall element. As the support configuration is constituted by a wall element a robust construction is obtained where channels for supplying said liquid via wall element for the cooling easily may be arranged to run in the wall element in any suitable way and with any suitable number of inlets and outlets in order to optimize cooling of electric motor and transmission configuration.

According to an embodiment of the device said support configuration is constituted by a spoke configuration. As the support configuration is constituted by a spoke configuration a stable and weight efficient construction where channels for supplying liquid via wall elements may easily be arranged to run in spokes of the spoke configuration for the cooling of electric motor and transmission configuration.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION OF THE INVENTION

Herein the term "the support configuration is arranged to support nozzles" refers to supporting of one or more nozzles, the nozzles according to a variant being constituted by separate nozzles supported by means of the support configuration and according to a variant of nozzles constituting an integrated part of the support configuration and thereby constituting machinings in the support configuration with nozzle function.

Figure 1:
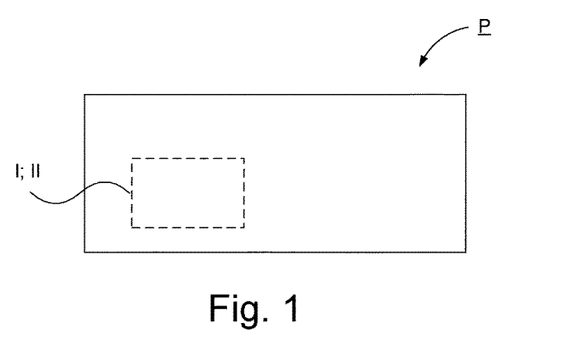
FIG. 1 schematically illustrates a platform according to an embodiment of the present invention.

With reference to FIG. 1 a platform P is shown, the platform P being comprised in a group comprising motor vehicles such as military vehicles, working vehicles, car, boat, helicopter or the corresponding, a power station, any suitable electrically driven machine or corresponding device where the device comprises an electric motor and a transmission configuration for driving of the same. The platform P comprises at least one electric motor 1 and a transmission configuration comprising a device I; II for liquid cooling of the electric motor 1 and transmission configuration according to the present invention.

Figure 2:
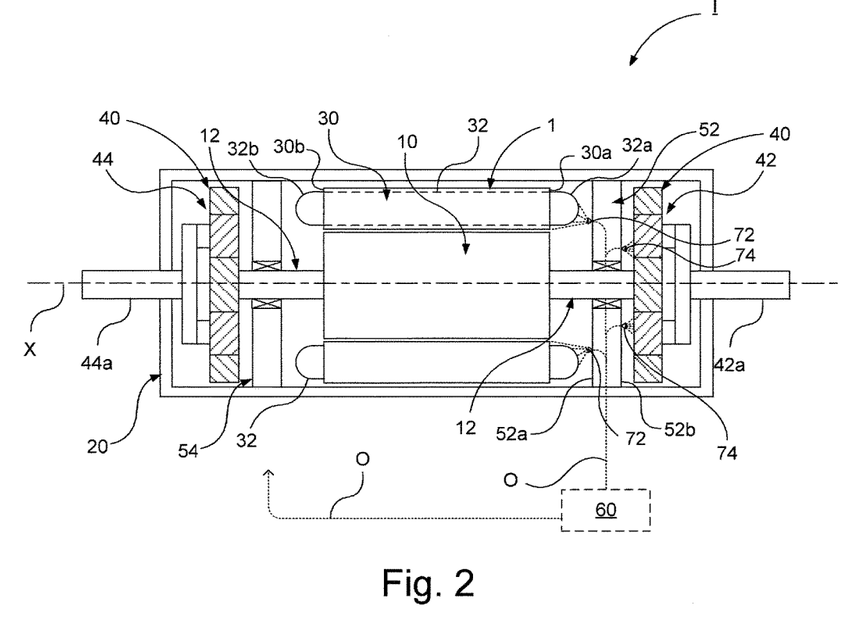
FIG. 2 schematically illustrates a side view of an electric motor and a transmission configuration supported by a support configuration, partly in axial cross section, with a device for liquid cooling of the electric motor and the transmission configuration according to an embodiment of the present invention.

FIG. 2 schematically illustrates a side view of an electric motor 1 and a transmission configuration 40 with a device I for liquid cooling of the electric motor and transmission configuration 40 according to an embodiment of the present invention. The electric motor 1 and transmission configuration 40 are comprised in a drive device.

The electric motor 1 is of inner rotor type comprising a rotor 10 and a stator 30 provided with windings. With electric motor 1 of inner rotor type is intended an electric motor 1 where the stator 30 is arranged to surround the rotor 10. The external surface of the rotor 10 is arranged adjacent to and separated from the internal surface of the stator 30. The rotor 10 is according to a variant built up by stacked rotor plates, not shown. The rotor 10 is arranged concentrically relative to the stator 30.

The rotor 10 is connected to a rotor shaft 12 constituting drive shaft. The rotor 10 is arranged to rotate the rotor shaft 12.

The stator 30 is according to a variant built up by stacked stator plates (not shown). The stator 30 comprises a stator winding 32. The stator winding comprises according to a variant a set of electrically conductive wires/conductors, through which a current is arranged to be conducted for driving of the electric motor 1. Said conductors may be of different thickness.

Said stator winding 32 is arranged to run axially such that the winding adjoins adjacently to the rotor. The stator winding 32 is arranged to axially project form end portions 30a, 30b of the stator 30, turn outside the end portions 30a, 30b and be re-introduced through the end portions, wherein said projecting portion 32a of the stator winding 32 forms a so called coil end 32b.

The stator winding 32 of the stator 30 is according to the present invention arranged to run along and axially projecting from and turn outside of the jacket surface of the stator 30.

The electric motor 1 and the transmission configuration 40 are arranged to be accommodated in a housing configuration 20.

The transmission configuration 40 comprises a first transmission configuration 42 and a second transmission configuration 44 where the electric motor 1 is arranged between the first transmission configuration 42 and the second transmission configuration 44. The first transmission configuration 42 is according to a variant constituted by a first planetary gear configuration and the second transmission configuration 44 is according to a variant constituted by a second planetary gear configuration.

The transmission configuration 40 comprises a transmission shaft.

The first transmission configuration 42 hereby comprises a first transmission shaft 42a and the second transmission configuration 44 comprises a second transmission shaft 44a.

The rotor shaft 12 and the first and second transmission shaft 42a, 44a are according to this embodiment aligned with each other. The rotor shaft 12 is connected to the first transmission shaft 42a via the first transmission configuration 42, the rotor shaft 12 is connected to the second transmission shaft 44a via the second transmission configuration 44.

The electric motor and the transmission configuration 40 are arranged to be journally supported by means of a support configuration 52, 54. The rotor 10 of the electric motor 1 is hereby arranged to be journally supported by means of the support configuration 52, 54 in that the rotor shaft 12 is being journally supported by means of the support configuration 52, 54.

According to this embodiment the support configuration 52, 54 comprises a first support configuration 52 arranged between one end of the electric motor 1 on the one hand and said first transmission configuration 42 on the other and a second support configuration 54 arranged between the opposite end of the electric motor 1 on the one hand and said second transmission configuration 44 on the other.

The respective support configuration 52, 54 has a main extension plane essentially perpendicular to said transmission shafts 42a, 44a and the axial direction X of the rotor shaft 12.

The device I for liquid cooling of the electric motor 1 and the transmission configuration 40 comprising lubrication of the transmission configuration 40 comprises means 60, 72, 74 for supplying a liquid O for said cooling and lubrication via said support configuration 40 in such a way that said electric motor as well as said transmission configuration are cooled/lubricated.

The means 60, 72, 74 for supplying liquid for cooling comprises according to a variant at least one pump 60 arranged to pump liquid O via the support configuration. In FIG. 2 the pump 60 for supplying liquid O for cooling is schematically illustrated in connection to the housing configuration 20.

The liquid O may be supplied via the support configuration 52, 54 for cooling/lubrication in any suitable way. According to a variant an oil sump is disposed in the bottom of the housing configuration 20 wherein the oil O from the oil sump is utilized for the cooling/lubrication. According to a variant the pump 60 is arranged in the housing configuration 20 for pumping of the oil O via the support configuration 52, 54 for cooling/lubrication of electric motor 1 and transmission configuration 42, 44. The pump may be driven electrically or mechanically via the electric motor 1/transmission configuration 42, 44.

According to a variant the oil O is arranged to be pumped way from the housing to a separate tank and then be supplied via the support configuration 52, 54 for cooling/lubrication.

Cooling liquid/oil will, after cooing/lubrication via the support configuration 52, 54, end up in the bottom of the housing configuration 20 from where it is pumped either directly to the support configuration or via for example a separate tank to be reintroduced for cooling via the support configuration 52, 54 in order to thus facilitated forced cooling.

According to a variant the means 60, 72, 74 comprises a pump 60 connected to the electric motor 1 in such a way that the pump 60 is activated by driving of the electric motor 1 such that cooling liquid O may be supplied to the respective end 10a, 10b of the rotor 10 and the respective transmission configuration 42, 44 via the respective support configuration 52, 54 when the need arises, i.e. when the electric motor 1 is driven such that the rotor 10 rotates.

According to the embodiment illustrated in FIG. 2 the means 60, 72, 74 is arranged to supply liquid O for cooling via the first support configuration for cooling of one of the end portions 30a of the electric motor 1 comprising the coil end 32b of the stator winding and the first transmission configuration 42. Further the means 60, 72, 74 is arranged to supply liquid O for cooling via the second support configuration 44 for cooling of the opposite second end portion 30b of the electric motor 1 comprising the coil end 32b of the stator winding and the second transmission configuration 44.

For the first support configuration 52 the transport via the support configuration 52 has been illustrated in more detail. The corresponding design for transport of liquid O for cooling according to an embodiment also holds for the second support configuration 54.

The first support configuration 52 comprises at least one inlet for receiving liquid O for cooling. According to a variant the liquid O is supplied for cooling via the housing configuration 20 into the support configuration 52. In FIGS. 4-7 embodiments of a support configuration are shown where among others examples of inlets, outlets and channels are illustrated.

The first support configuration 52 is arranged to support nozzles 72, 74 for liquid supply for said cooling. The means 60, 72, 745 for supplying liquid O for cooling comprises according to a variant said nozzles 72, 74.

The support configuration 52 is arranged to support nozzles 72 for liquid supply for cooling of the first end portion 30a of the electric motor 1 comprising the coil end 32a of the stator winding. The nozzles 72 for cooling of the first end portion 30a of the electric motor 1 comprising the coil ends 32a of the stator winding are arranged on the side 52a of the support configuration 52 facing the first end portion 30a of the electric motor 1 wherein the pump 60 is arranged to pump the liquid O for cooling through the first support configuration 52 to said nozzles 72 for liquid supply for cooling of the second end portion 30a of the electric motor 1.

The support configuration 52 is arranged to support nozzles 74 for liquid supply for cooling and lubrication of the first transmission configuration 42. The nozzles 74 for cooling of the first transmission configuration 42 are arranged on the side 52b of the support configuration 52 facing the first transmission configuration 42 wherein the pump 60 is arranged to pump the liquid for cooling and lubrication through the first support configuration 52 to said nozzles 74 for liquid supply for cooling of the first transmission configuration 42.

Figure 3:
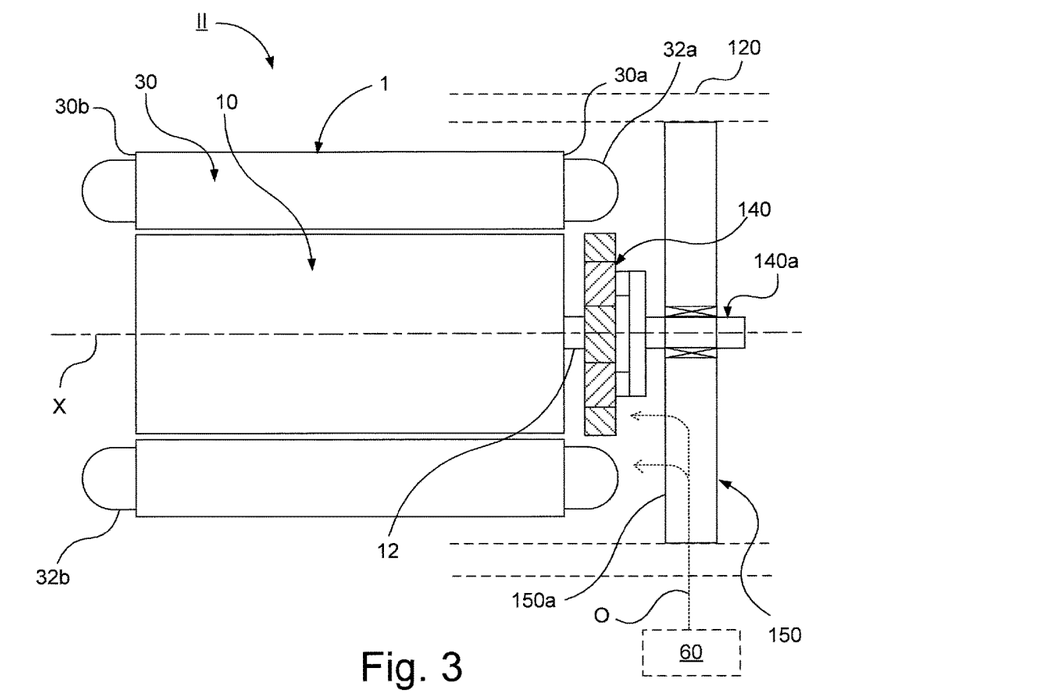
FIG. 3 schematically illustrates a side view of an electric motor and a transmission configuration supported by a support configuration, partly in axial cross section, with a device for liquid cooling of the electric motor and the transmission configuration according to an embodiment of the present invention.

FIG. 3 schematically illustrates a side view of an electric motor 1 and a transmission configuration 140 with a device II for liquid cooling of the electric motor 1 and the transmission configuration 140 according to an embodiment of the present invention. The electric motor 1 and the transmission configuration 140 are comprised in a drive device. Herein only a part of the housing configuration 120 is shown in which the electric motor 1 and the transmission configuration 140 are arranged to be accommodated.

The embodiment illustrated in FIG. 3 differs from the embodiment illustrated in FIG. 2 among others by the placement of the transmission configuration 140 relative to the support configuration 150.

In the embodiment in FIG. 3 only one transmission configuration 140 and one support configuration 150 arranged at the first end portion 30a of the electric motor are illustrated. The drive device according to FIG. 3 could according to a variant have the corresponding transmission configuration and support configuration arranged at the opposite end portion of the electric motor.

According to this embodiment said support configuration 150 is arranged outside the electric motor 1 as well as the transmission configuration 140 viewed in the axial X direction of the rotor shaft and transmission shaft 140a. the electric motor 1 and the transmission configuration 140 are arranged to be journally supported by means of the support configuration 150, in that the transmission shaft 140a is journally supported by means of the support configuration 150.

The support configuration is arranged to support nozzles for liquid supply for cooling of the first end portion 30a of the electric motor comprising the coil end 32a of the stator winding. The nozzles (not shown) are arranged on the side 150a of the support configuration facing the first end portion 30a of the electric motor 1 and the transmission configuration 140 wherein the pump 60 is arranged to pump the liquid O for cooling through the support configuration 140 for liquid supply for cooling of the first end portion 30a of the electric motor.

The support configuration 140 is arranged to support nozzles (not shown) for liquid supply for cooling of the transmission configuration 140. The nozzles for cooling of the transmission configuration are intended to be arranged on the side 150a of the support configuration 150 facing the first end portion 30a of the electric motor 1 and the transmission configuration 140 wherein the pump 60 is arranged to pump the liquid for cooling through the second support configuration for liquid supply for cooling of the transmission configuration 140.

According to this embodiment the nozzles are intended to be arranged on the same side 150a of the support configuration 150, where the nozzles for cooling of the electric motor are intended to be arranged in connection to en portion 30a of the electric motor 1 for cooling of coil ends 32a and nozzles for cooling of the transmission configuration 140 are intended to be arranged in connection to the transmission configuration 140. According to an alternative variant the same nozzles is intended to be arranged for cooling of both electric motor 1 and transmission configuration 140.

Figure 4:
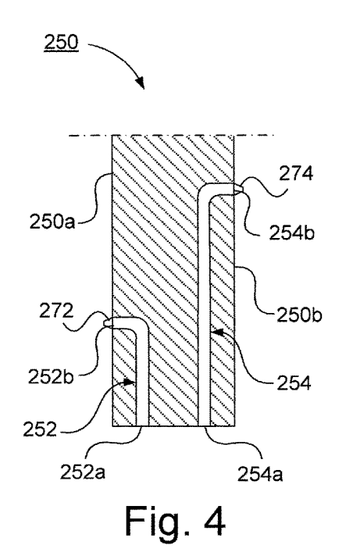
FIG. 4 schematically illustrates a side view in axial cross section of a support configuration of a device for liquid cooling according to an embodiment of the present invention.

FIG. 4 schematically illustrates a side view in axial cross section of a part of a support configuration 250 of a device for liquid cooling according to an embodiment of the present invention.

The support configuration 250 according to the embodiment in FIG. 4 is intended to be arranged between an end of the electric motor and a transmission configuration e.g. in accordance with the support configuration in FIG. 2.

The support configuration 250 has a channel configuration 252, 254 for supplying cooling liquid via the support configuration 250 to electric motor and transmission configuration.

The channel configuration 252, 254 has a first channel 252 with an inlet 252a arranged in the periphery of the support configuration 250 and an outlet 252b arranged on the side of the support configuration intended to face a side of the electric motor. A nozzle 272 is arranged in connection to the outlet 252b for optimized supply of liquid to the electric motor and the coil ends of its stator.

The channel configuration 250 has a second channel 254 separated from said first channel 252. The second channel 254 has an inlet 254a arranged in the periphery of the support configuration 250 and an outlet 254b arranged on the side 250b of the support configuration 250 intended to face the transmission configuration. A nozzle 274 is arranged in connection to the outlet 254b for optimized supply of cooling liquid to the transmission configuration for cooling and lubrication.

Figure 5:
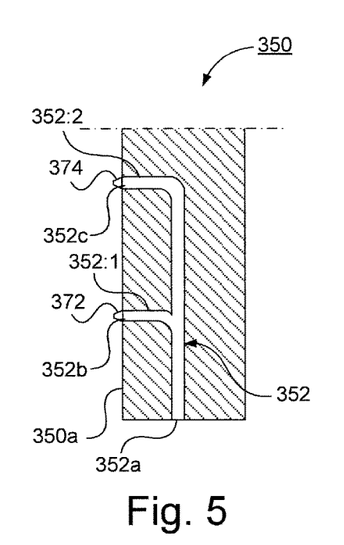
FIG. 5 schematically illustrates a side view in axial cross section of a support configuration of a device for liquid cooling according to an embodiment of the present invention.

FIG. 5 schematically illustrates a side view in axial cross section of a part of a support configuration 350 of a device for liquid cooling according to an embodiment of the present invention.

The support configuration 350 is according to the embodiment in FIG. 4 intended to be arranged outside the electric motor as well as said transmission configuration viewed in the axial direction of the rotor shat and the transmission shaft e.g. in accordance with the support configuration in FIG. 3.

The support configuration 350 has a channel configuration 352 for supplying liquid via the support configuration 350 to electric motor and transmission configuration.

The channel configuration 352 has an inlet 352a arranged in the periphery of the support configuration 350. The channel configuration 352 has a branching with a first channel portion 352:1 with a first outlet 352b arranged on the side 350a of the support configuration 350 intended to face a side of the electric motor and a second channel portion 352:2 with a second outlet 352c arranged on the same side 350a, i.e. the side 350a of the support configuration 350 intended to face the transmission configuration. A nozzle 372 is arranged in connection to the first outlet 352b for optimized supply of cooling liquid to the electric motor and the coil ends of its stator. A nozzle 374 is arranged in connection to the second outlet 352c for optimized supply of cooling liquid to the transmission configuration for cooling and lubrication.

Figure 6:
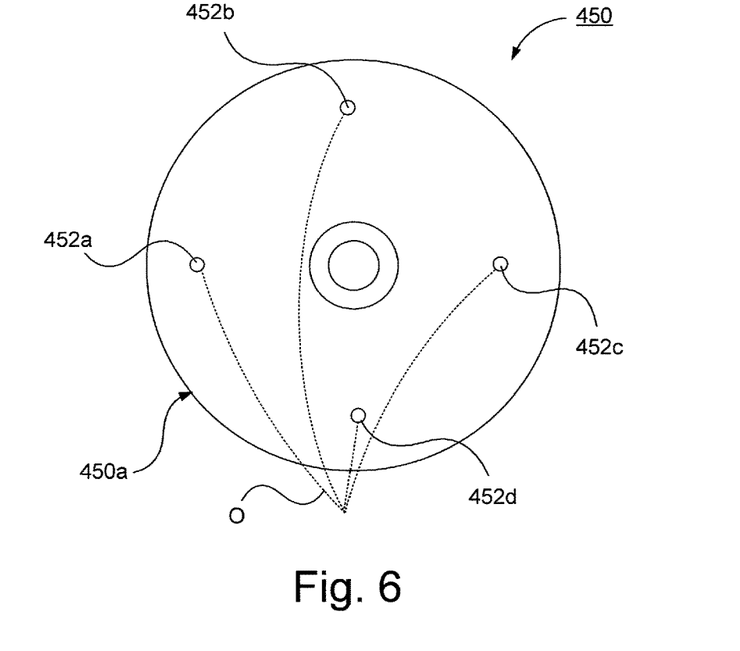
FIG. 6 schematically illustrates a view viewed in the axial direction of a support configuration of a device for liquid cooling according to an embodiment of the present invention.

FIG. 6 schematically illustrates a view viewed in the axial direction of a support configuration 450 of a device for liquid cooling according to an embodiment of the present invention.

According to this embodiment the support configuration 450 is constituted by a wall element, the wall element according to a variant having a circular cylindrical body 450a. The support configuration 450 designed as a wall element according to this embodiment has outlets 452a, 452b, 452c, 452d arranged at least on one side to which cooling liquid O is arranged to be transported in the support configuration 450 to then be supplied to the electric motor and the transmission configuration for cooling.

Figure 7:
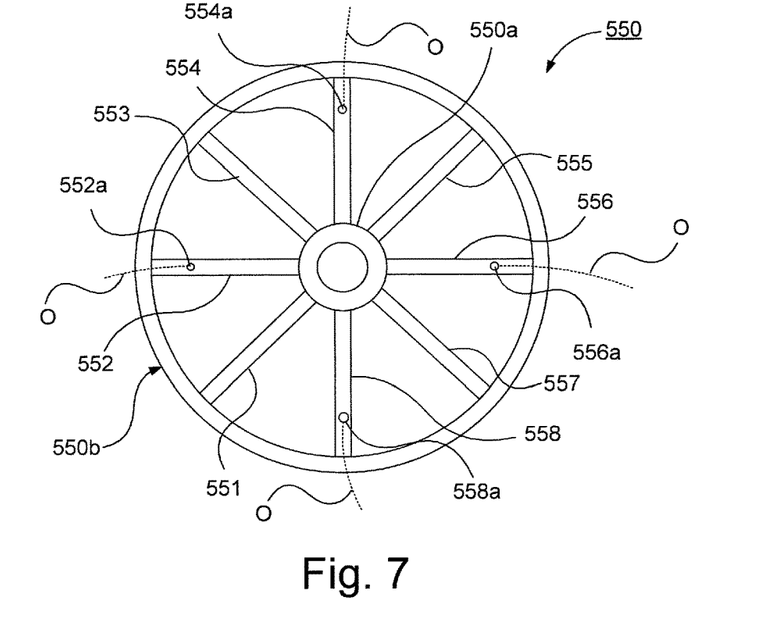
FIG. 7 schematically illustrates a view viewed in the axial direction of a support configuration of a device for liquid cooling according to an embodiment of the present invention.

FIG. 7 schematically illustrates a view viewed in the axial direction of a support configuration of a device for liquid cooling according to an embodiment of the present invention.

According to this embodiment the support configuration 550 is constituted by a spoke configuration. The support configuration designed as a spoke configuration 550 has a set of spokes 551, 552, 553, 554, 555, 556, 557, 558 arranged to run radially from a centre portion 550a of the support configuration 550 to a peripheral area 550b of the support configuration. The centre portion 550a is intended to be journally connected to and surround the rotor shaft or the transmission shaft. the peripheral area 550b is constituted by a ring-shaped edge portion 550b intended to internally abut and to be fixed to the housing configuration. According to an alternative variant the support configuration has no ring-shaped edge portion, wherein the spokes of the support configuration are arranged to be internally fastened directly to the housing configuration.

The cooling liquid O is arranged via inlets to be transported in channels of spokes 552, 554, 556, 558 to outlets 552a, 554a, 556a, 558a of the spokes for the support configuration 550 to then be supplied to the electric motor and the transmission configuration for cooling.

Above different embodiments of support configuration for supporting of electric motor and transmission configuration have been described and via which support configuration liquid for cooling is arranged to be supplied in such a way that said electric motor as well as said transmission configuration are cooled.

The support configuration may have any suitable design for facilitating supply of said liquid for cooling via the same. The support configuration may have any suitable channel configuration for transporting of cooling liquid via the support configuration. The support configuration may have one or more inlet and one or more outlets. The support configuration may have channel configuration with branchings and/or having channel configuration with several channels.

The support configuration may be an integrated part of the housing configuration or a separate part attached to the housing configuration.

Figure 8:
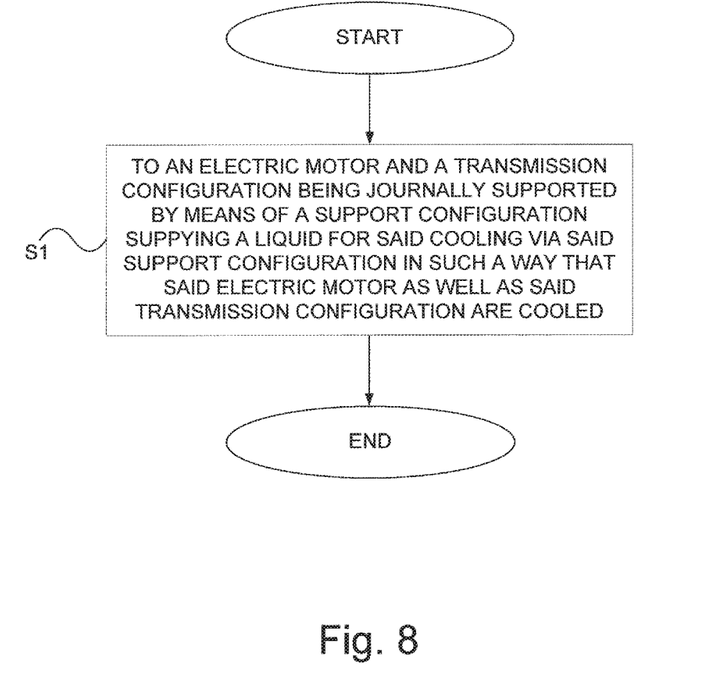
FIG. 8 schematically illustrates a block diagram of a method for liquid cooling of an electric motor and transmission configuration according to an embodiment of the present invention.

FIG. 8 schematically illustrates a block diagram of a method for liquid cooling of an electric motor and a transmission configuration according to an embodiment of the present invention. The electric motor comprises a rotor with a rotor shaft and a stator provided with windings, and the transmission configuration comprises a transmission shaft, wherein rotor and transmission configuration are journally supported by means of a support configuration.

According to an embodiment the method for liquid cooling of such an electric motor and transmission configuration comprises a method step S1. In this step a liquid is supplied for said cooling via said support configuration in such a way that said electric motor as well as said transmission configuration are cooled.

The foregoing description of the preferred embodiments of the present invention has been provided for the purposes of illustration and description. It is not intended to be exhaustive or to limit the invention to the precise forms disclosed. Many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for liquid cooling of an electric motor and a transmission configuration, wherein the electric motor comprises a rotor with a rotor shaft and a stator provided with windings, and wherein the transmission configuration comprises a transmission shaft aligned with the rotor shaft in an axial direction, the method comprising:
   journally supporting the rotor and the transmission configuration by a support configuration, the support configuration having a main extension plane essentially perpendicular to the axial direction defined by the aligned shafts; and
   supplying a liquid for said cooling via said support configuration by applying the liquid from the support configuration directly onto the electric motor and the transmission configuration such that said electric motor as well as said transmission configuration are directly cooled.

2. The method according to claim 1, wherein said liquid is oil-based.

3. The method according to claim 1, wherein at least one nozzle for liquid supply for said cooling is supported by said support configuration.

4. The method according to claim 1, wherein said support configuration is arranged between an end of the electric motor and said transmission configuration.

5. The method according to claim 1, wherein said support configuration is arranged outside the electric motor as well as said transmission configuration viewed in the axial direction of said shafts.

6. The method according to claim 1, wherein the electric motor, the transmission configuration, and the support configuration are arranged within a housing.

7. The method according to claim 1, wherein the support configuration includes a center portion that is journally connected to and surrounding the rotor shaft or the transmission shaft.

8. The method according to claim 1, further wherein the liquid is ejected along the axial direction by at least one nozzle supported by the support configuration.

9. The method according to claim 1, further comprising ejecting the liquid from the main extension plane of the support configuration directly onto the electric motor and the transmission configuration.

10. A device for liquid cooling of an electric motor and a transmission configuration, wherein the electric motor comprises a rotor with a rotor shaft and a stator-provided with windings, and wherein the transmission configuration comprises a transmission shaft aligned with the rotor shaft in an axial direction, wherein the rotor and the transmission configuration are journally supported by a support configuration having a main extension plane essentially perpendicular to the axial direction defined by the aligned shafts, the device comprising at least one component configured to supply for said cooling via said support configuration by applying a liquid from the support configuration directly onto the electric motor and the transmission configuration such that said electric motor as well as said transmission configuration are directly cooled.

11. The device according to claim 10, wherein said liquid is oil-based.

12. The device according to claim 10, wherein at least one nozzle for liquid supply for said cooling is arranged to be supported by means of said support configuration.

13. The device according to claim 10, wherein said support configuration is arranged between an end of the electric motor and said transmission configuration.

14. The device according to claim 10, wherein said support configuration is arranged outside the electric motor as well as said transmission configuration viewed in the axial direction of said shafts.

15. The device according to claim 10, wherein said support configuration is constituted by a wall element.

16. The device according to claim 10, wherein said support configuration is constituted by a spoke configuration.

17. The platform comprising a device according to claim 10.

* * * * *